(12) United States Patent
Srinivasan

(10) Patent No.: US 8,347,290 B2
(45) Date of Patent: Jan. 1, 2013

(54) MONITORING SPIN LOCKS IN VIRTUAL MACHINES IN A COMPUTING SYSTEM ENVIRONMENT

(75) Inventor: Kattiganehalli Y. Srinivasan, Princeton Junction, NJ (US)

(73) Assignee: Novell, Inc., Provo, UT (US)

( * ) Notice: Subject to any disclaimer, the term of this patent is extended or adjusted under 35 U.S.C. 154(b) by 460 days.

(21) Appl. No.: 12/619,140

(22) Filed: Nov. 16, 2009

(65) Prior Publication Data
US 2011/0119667 A1 May 19, 2011

(51) Int. Cl.
*G06F 9/46* (2006.01)
(52) U.S. Cl. ........................... 718/100; 718/104
(58) Field of Classification Search ............... None
See application file for complete search history.

(56) References Cited

U.S. PATENT DOCUMENTS

| | | | |
|---|---|---|---|
| 6,687,903 B1 * | 2/2004 | Chalmer et al. | 718/100 |
| 7,765,543 B1 * | 7/2010 | Weissman et al. | 718/1 |
| 7,836,275 B2 * | 11/2010 | Anderson et al. | 711/206 |
| 2008/0184249 A1 | 7/2008 | Adams et al. | |
| 2009/0094431 A1 * | 4/2009 | Sarkar et al. | 711/163 |
| 2009/0199184 A1 | 8/2009 | Arimilli et al. | |
| 2009/0204978 A1 | 8/2009 | Lee et al. | |
| 2010/0299665 A1 * | 11/2010 | Adams | 718/1 |

OTHER PUBLICATIONS http://en.wikipedia.org/wiki/Spinlock; "Spinlock"; Printed Oct. 20, 2009; 3 Pages.
http://www.cs.fsu.edu/~baker/devices/notes/spinlock.html; "Linux Spinlock Implementation"; © 1999-2008 T. P. Baker; 6 Pages.
http://lwn.net/Articles/267968/; "Ticket spinlocks"; Jonathan Corbet; Feb. 6, 2008; 6 Pages.
http://lkml.org/lkml/2007/8/8/6; "Ticket lock spinlock"; Nick Piggin; Aug. 8, 2007; 3 Pages.

* cited by examiner

*Primary Examiner* — Emerson Puente
*Assistant Examiner* — Gregory Kessler
(74) *Attorney, Agent, or Firm* — King & Schickli, PLLC

(57) ABSTRACT

Methods and apparatus involve monitoring spin locks for guest devices. Fully virtualized guests have multiple virtual processors configured under the scheduling control of a hypervisor on a physical hardware platform. The hypervisor posts On CPU and CR3 load information to shared communications pages for each of the processors. A monitoring module in the guest device monitors the pages to ascertain forward progress of the processors. If forward progress is being made, the virtual processors continue to spin. If not, the CPU's control is variously relinquished. The monitoring module typifies a kernel driver so that the guest can maintain an unmodified operating system. Ticket spin locks, and their ordering, are also considered as are computations for lock owners. Other features contemplate computing systems and computer program products, to name a few.

7 Claims, 4 Drawing Sheets

MONITORING SPIN LOCKS IN VIRTUAL MACHINES IN A COMPUTING SYSTEM ENVIRONMENT

FIELD OF THE INVENTION

Generally, the present invention relates to computing devices and environments involving virtual machines. Particularly, although not exclusively, it relates to spin locks in such environments and monitoring same for optimized performance. Certain embodiments contemplate fully virtualized guest devices with kernel drivers to keep track of forward progress of virtual processors. Hypervisors provide relevant information to the drivers. Control of physical CPUs are variously relinquished in situations requiring it. Still other embodiments contemplate computing systems and computer program products, to name a few.

BACKGROUND OF THE INVENTION

As is known, "spin locks" are computing locks where threads wait in a loop (e.g., "spin") until the locks become available. Computing operating systems use spin locks to serialize access to various critical sections when they are very short in duration. When a processor is executing in a critical section, other processors seeking to enter the critical section wait for their turn by implementing a "busy wait," thereby "spinning" on the lock until the lock is available. Since the wait time to acquire the lock is small compared to the time it takes to incur the cost of two context switches (e.g., one to switch out when the lock is not available and one to switch back in when the lock is available), it is more efficient for processors to simply wait for lock acquisition.

Spin locks are also used for serialization when a processor does not have the context to block, such as when the processor is executing in an interrupted context. When an operating system is hosted as a virtual machine on a hypervisor, spin locks present an even further unique performance problem. Consider, for instance, a symmetrical multiprocessing (SMP) guest that is allocated multiple virtual processors (VCPUs). To illustrate the problems being solved in this invention, assume that the number of VCPUs assigned to the guest exceeds the number of physical processors on the machine. In this scenario, when the hypervisor schedules a specific virtual processor of a specific guest, it is possible that the scheduled VCPU might spend the entire time quantum assigned to the VCPU in busy waiting for a spin lock whose holder may have been earlier descheduled by the same hypervisor. As the processor over-commitment increases, the performance problems become worse as multiple CPU cycles are wasted with little or no forward progress. While this problem has been addressed in the past by "para-virtualizing" guests with kernels variously modified to execute on the hypervisor, recent advances in hardware suggest considerable interest in hosting unmodified operating systems as virtual machines thereby obviating para-virtualization.

In another example, consider a fully virtualized (unmodified) guest assigned three VCPUs. It is hosted on a hardware platform having two physical CPUs and a hypervisor multiplexes all of the VCPUs over the two available physical CPUs. In addition, spin lock hold times include events scheduled by the hypervisor and such can become elongated with the occurrence of certain other events. If a first VCPU holding the spin lock gets preempted in lieu of the second and third VCPUs, the hold time for the lock held by the first VCPU will be extended by the time quantum allocated to all the VCPUs ahead of it. This is further exasperated in situations in which the guest implements a fairness policy when granting the spin locks, e.g., "Ticket Spin Locks." Broadly, ticket spin locks implement fairness by honoring the order in which VCPUs enter the waiting loop and implement a "first-in first-out" servicing strategy. However, since the hypervisor is unaware of this ticket ordering information, any scheduling decision taken by the hypervisor can result in a pathological situation whereby the lock is free but the VCPU that is scheduled cannot acquire the lock since it is not at the head of the list to acquire the lock.

Accordingly, a need exists for better monitoring spin locks. The need further extends to at least the following: detecting situations in which VCPUs may be burning CPU cycles unnecessarily while spinning on a lock whose holder has been preempted by a hypervisor; implementing virtualization-friendly spin locks in a manner transparent to the guest to allow fully virtualized guests; and addressing specialty situations involving ticketed spin locks. Appreciating "cloud" computing environments and more traditional data centers are not always consistent in their selection of computing platforms, the need should further contemplate spin locks in an agnostic fashion where operating systems and physical hardware vary from one box to the next. Any improvements along such lines should also contemplate good engineering practices, such as simplicity, ease of implementation, unobtrusiveness, stability, etc.

SUMMARY OF THE INVENTION

By applying the principles and teachings associated with monitoring spin locks in virtual machines of a computing system environment, the foregoing and other problems become solved. Broadly, methods and apparatus involve spin locks for guest devices. Fully virtualized guests have multiple virtual processors configured under the scheduling control of a hypervisor on a physical hardware platform. A monitoring module of the guest monitors the forward progress of each virtual processor. It allows those that are progressing to continue spinning, while the physical CPU of the hardware will be relinquished for those that are not. The monitoring module typifies a kernel driver so that the guest can maintain an unmodified operating system and kernel.

In more detail, the hypervisor posts On CPU and CR3 load information to shared communications pages for each of the processors. The On CPU information exists as a flag set or cleared when a virtual CPU (VCPU) is scheduled or descheduled from the physical CPU of the hardware platform. The CR3 load information, on the other hand, exists as a raw number of loads. Upon monitoring by the kernel driver, if a VCPU under consideration has not had a CR3 load within a predetermined period, it is possible a problem exists with spin locking. If so, interrupted program counter values are examined to see if they reside within a spin lock code block. If yes, a spin lock problem may still exist. The VCPU owning the spin lock is then computed as is any ticket ordering information for ticketed spin locks.

If the computed holder of the spin lock is determined to be On CPU, monitoring returns to the interrupted context. Otherwise, it is determined whether all other VCPUs ahead of the VCPU in question are also flagged as On CPU. If so, the VCPU in question continues to spin and wait its turn for the physical CPU. If not, the physical CPU is variously relinquished.

Details regarding monitoring periods, calculating lock holders and ticket information are other features as are techniques to relinquish the CPU. Preferably, lock owners and ticket ordering are obtained from saved register states in the interrupted context. Other features contemplate computing systems, executable instructions loaded on one or more computing devices for undertaking the foregoing, and computer program products available as a download or on a computer-readable medium. The computer program products are available for installation on a network appliance or an individual computing device.

Certain advantages realized by embodiments of the invention include, but are not limited to: addressing performance issues posed by spin locks in fully virtualized guests, including doing so in a guest-agnostic fashion with schemes that can be implemented on a range of guests (e.g., Unix, Linux and Windows, etc); minimizing lock overhead when a lock is not contested; detecting if a fully virtualized guest (unmodified guest) is making forward progress; and addressing specialty performance issues of ticketed spin locks in virtualized environments.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for monitoring spin locks in a computing environment with virtual machines.

Figure 1:
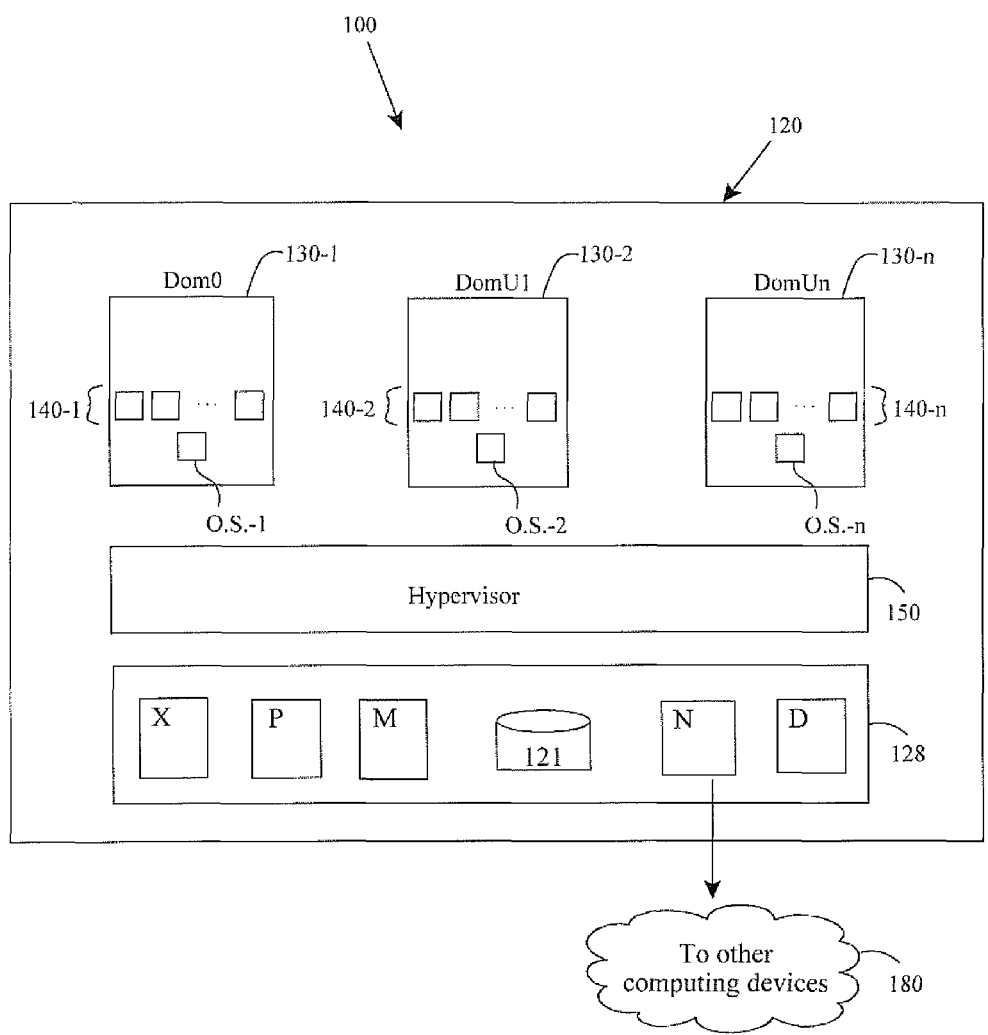
FIG. 1 is a diagrammatic view in accordance with the present invention of a basic computing device hosting virtual machines.

With reference to FIG. 1, a computing system environment 100 includes a computing device 120. Representatively, the device is a general or special-purpose computer, a phone, a PDA, a server, a laptop, etc., having a hardware platform 128. The hardware platform includes physical I/O and platform devices, memory (M), processor (P), such as a physical CPU (s), USB or other interfaces (X), drivers (D), etc. In turn, the hardware platform hosts one or more guest virtual machines in the form of domains 130-1 (domain 0, or management domain), 130-2 (domain U1), . . . 130-*n* (domain Un), each potentially having its own guest operating system (O.S.) (e.g., Linux, Windows, Netware, Unix, etc.), applications 140-1, 140-2, . . . 140-*n*, file systems, etc. The workloads of each virtual machine also consume data stored on one or more disks 121.

An intervening Xen, Hyper V, KVM, VmWare or other hypervisor 150, also known as a "virtual machine monitor," or virtualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform.

In use, the representative computing device 120 is arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

Figure 2:
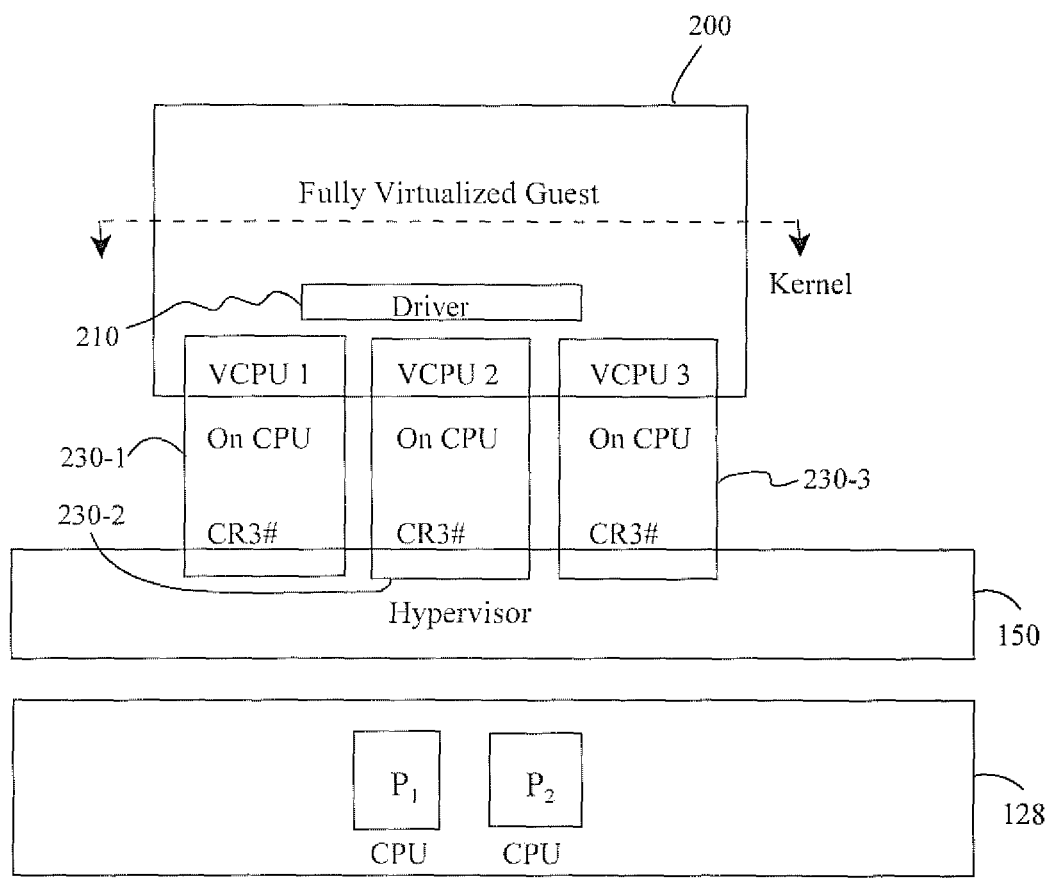
FIG. 2 is a diagrammatic view in accordance with the present invention for monitoring spin locks.

Leveraging the foregoing, FIG. 2 shows one of many possible fully virtualized guests 200 configured on a hardware platform 128 under the scheduling control of a hypervisor 150. The guest includes a plurality of virtual processors VCPU1-3 executing on physical processors P1, P2 of the hardware. The guest also includes a kernel-loadable module 210, e.g., a driver, that implements monitoring of spin locks. Because of its loadable-driver format, "virtualization unaware kernels" (e.g., fully virtualized kernels) execute having none of the performance issues listed earlier. This driver can also be ported to work for Windows, Unix, etc., in addition to its preferred Linux kernel. The kernel also remains responsible for traditional roles such as managing resources between the hardware and software. It can be thought of as the lowest-level abstraction layer for memory, processors, I/O devices, etc., that application software must control to perform its functions. The kernel can also be designed in monolithic or microkernel fashion as is presently done. In turn, tasks may be executed differently depending on its design.

Figure 3:
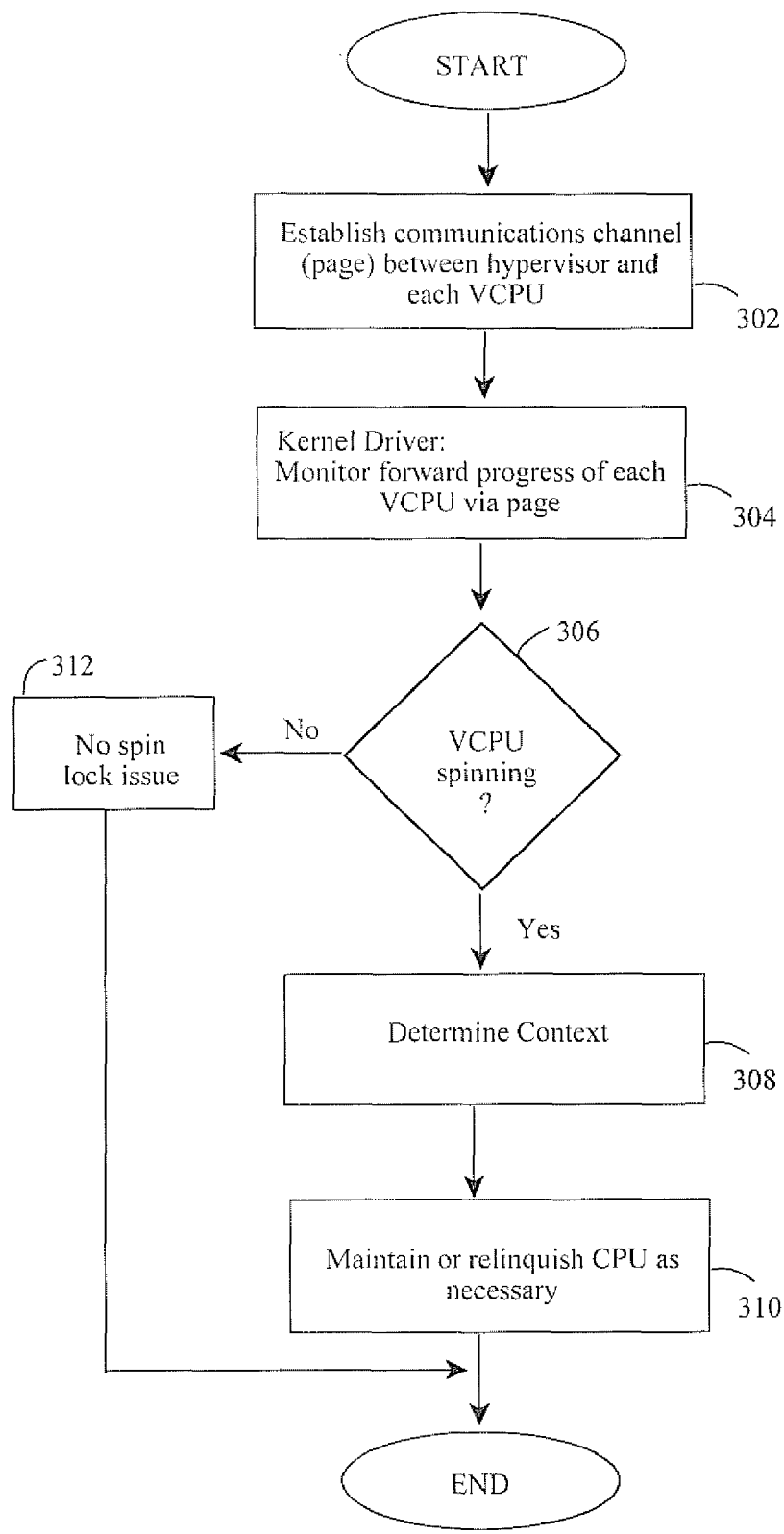
FIGS. 3 and 4 are flow charts of various detail in accordance with the present invention for further monitoring spin locks.
Figure 4:
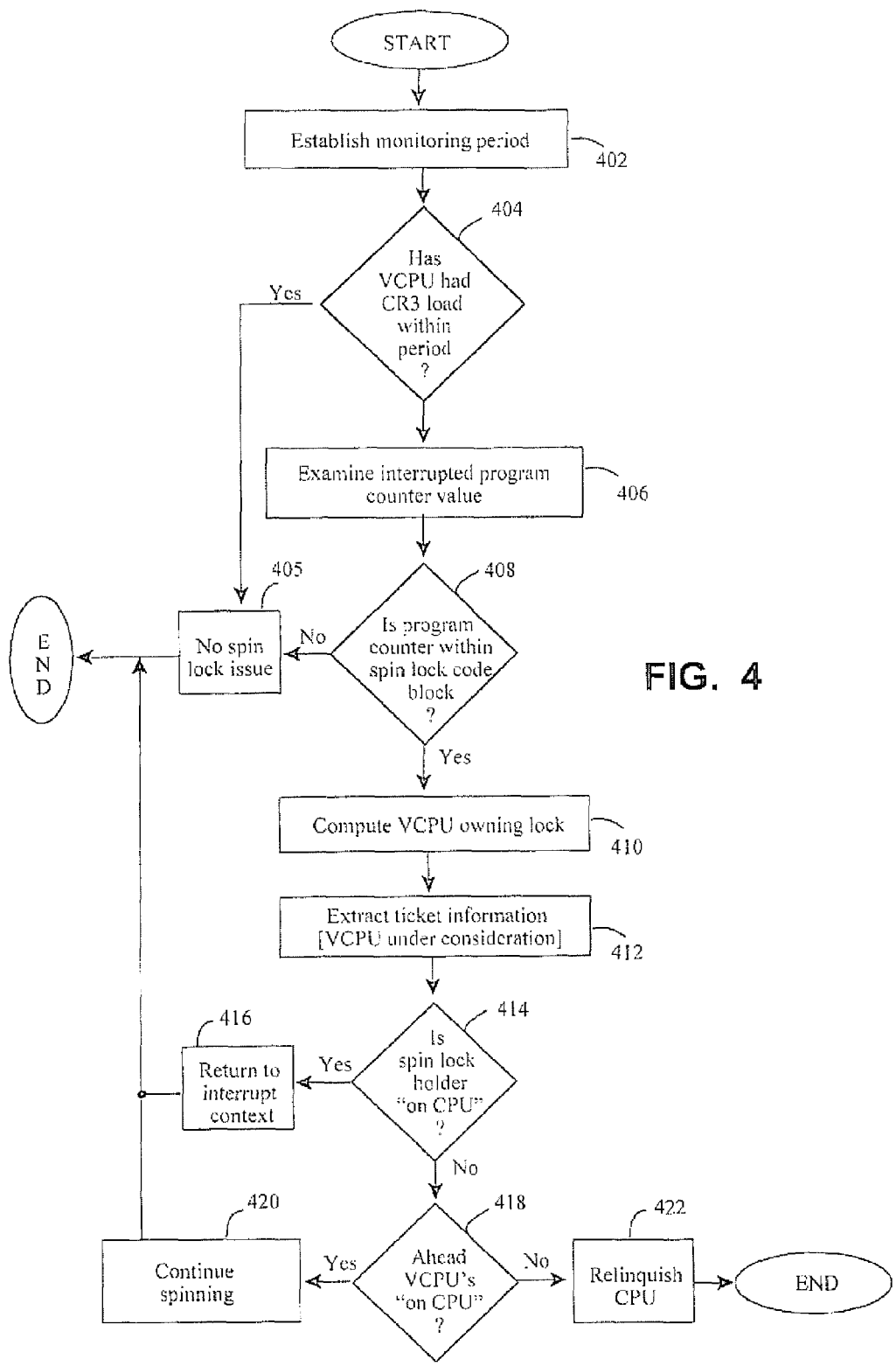

With continued reference to FIG. 2, and further reference to FIGS. 3 and 4, the driver 210 sets up a communications channel, e.g., communications page 230-1, 230-2, 230-3, between the hypervisor 150 and each VCPU in the guest, at step 302.

At step 304, the hypervisor posts and updates certain events of interest for each VCPU in the shared page and the driver monitors them when determining forward progress for each of the VCPUs. If forward progress is being made, the VCPUs are allowed to continue. If not, the spin lock control may need altering, including relinquishing control of a physical CPU. Among other things, forward progress begins by first noting whether a VCPU under consideration is even spinning, step 306. If so, the context in which it is spinning is ascertained, step 308, and control of the physical CPU is either maintained or relinquished for situations demanding it, step 310. On the other hand, if no spinning is occurring, no spin lock issues are present at step 312 and traditional processing can occur.

In more detail, the events of interest posted and updated by the hypervisor on the communications page 230 include, but are not limited to, an "On CPU" flag being set or cleared and a raw number of CR3 loads for each VCPU of interest. As is typical, an On CPU flag is set when a VCPU is scheduled by a hypervisor onto a physical CPU. Conversely, the flag is cleared when the VCPU is de-scheduled from the physical CPU. CR3 loads, on the other hand, relate to how many instances of loading occurs for the CR3. The control register CR3 (on x86 instruction set architecture machines) defines the base address of the page table hierarchy. To effect an address space switch, the CR3 has to be loaded. For fully virtualized guests, this load is trapped and the hypervisor performs the CR3 loads. Thus, all guest CR3 loads are visible to the hypervisor and this information can be passed back to the driver 210 via the shared communications page.

In FIG. 4, the driver monitors the progress of each VCPU by first establishing a predetermined monitoring period, step 402. In one instance, this occurs by the driver setting-up periodic timeouts on each of the VCPUs in the guest. For example, the driver could setup a timeout so that a control is obtained on every $4^{th}$, $5^{th}$, and/or $6^{th}$, etc., timer interrupt taken on a specific VCPU. If monitoring occurred more often than this, more problems could be detected, and detected earlier. However, there is an overhead cost associated with too much monitoring, especially when no issues are even suspected. Thus, the two are to be balanced against one another.

At step 404, it is determined whether a VCPU under consideration has had a CR3 load within this monitoring period. If so, there is no spin lock issue at hand, step 405, since the CR3 has in fact been loaded. If not, however, there may exist a spin lock problem requiring further investigation.

To further ascertain if spin lock is at issue, the interrupted program counter value is examined at step 406. If the program counter is found within the spin lock code block, spin lock related problems may still be at play. If the interrupted program counter is not within the spin lock code block, there exists no spin lock issue at step 405.

At step 408, if the interrupted program counter is in the spin lock code block, the VCPU owner of the lock is computed at step 410. In one embodiment, computation includes extracting the address of the lock from the saved register state of the interrupted context. At step 412, any ticket ordering information is also extracted from the saved register state for the VCPU under consideration.

To the extent the holder of the spin lock is currently considered "On CPU" by the hypervisor, at step 414, nothing further needs to occur and processing can return to the interrupted context at step 416. However, for ticketed spin lock, it only makes sense to continue spinning a VCPU at step 420 if all other VCPUs that are ahead in the ticket line with respect to the VCPU under question are all also considered "On CPU" at step 418. If this is not the case, it makes sense to relinquish the CPU at step 422. In one instance, the physical CPU is relinquished on the VCPU under question. To do this, a new frame is pushed on the interrupted stack so that on return from the timer interrupt, the VCPU under question relinquishes the CPU after queuing itself on a prioritized wait queue. This queue is ordered based on the ticket value. If the spin lock holder is not currently scheduled, conversely, the CPU is relinquished on the monitored VCPU.

Also, the hypervisor 150 can generate an interrupt to notify the monitoring driver 210 each time a VCPU is either scheduled or de-scheduled in the hypervisor. In turn, the notification of a VCPU being scheduled is used to wake up VCPUs that have been put to sleep by the monitoring driver. In the situation of normal spin locks, the driver can wake up all the waiting VCPUs. If the spin locks are ticketed, the driver need only wake up the VCPU that is scheduled to get the lock next.

In still other embodiments, skilled artisans will appreciate that enterprises can implement some or all of the foregoing with the assistance of system administrators acting on computing devices by way of executable code. In turn, methods and apparatus of the invention further contemplate computer-executable instructions, e.g., code or software, as part of computer program products on readable media, e.g., disks for insertion in a drive of computing device, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of the other figures.

The invention claimed is:

1. In a computing system environment, a method of monitoring spin locks for guest computing devices having multiple virtual processors configured under the scheduling control of a hypervisor on a hardware platform having at least one physical processor and memory, comprising:
determining which of the virtual processors is an owner of a spin lock under consideration;
determining whether the owner is considered On CPU by the hypervisor; and
relinquishing control of the physical processor to another of the virtual processors if the owner is not said considered On CPU and a ticket order of the virtual processors ahead of the owner are also not considered On CPU.

2. The method of claim 1, further including determining whether CR3 loads have occurred within a predefined monitoring period before determining the owner.

3. The method of claim 1, further including examining an interrupted program counter value.

4. The method of claim 3, further including determining whether the program counter value is found within a spin lock code block.

5. The method of claim 1, wherein the determining the owner further includes extracting an address of the spin lock from a saved register state of an interrupted context.

6. The method of claim 5, wherein the ticket order is extracted from the saved register state.

7. In a computing system environment, a method of monitoring spin locks for guest computing devices having multiple virtual processors configured under the scheduling control of a hypervisor on a hardware platform having at least one physical processor and memory, comprising:

determining which of the virtual processors is an owner of a spin lock under consideration;
determining whether the owner is considered On CPU by the hypervisor; and
relinquishing control of the physical processor to another of the virtual processors if the owner is not said considered On CPU and a ticket order of the virtual processors ahead of the owner are also not considered On CPU, wherein the ticket order is extracted from a saved register state of an interrupted context.

* * * * *